US012689790B2

(12) United States Patent
Jin et al.

(10) Patent No.: US 12,689,790 B2
(45) Date of Patent: Jul. 21, 2026

(54) VIDEO GENERATION METHOD, APPARATUS, DEVICE, STORAGE MEDIUM AND PROGRAM PRODUCT

(71) Applicant: LEMON INC., Grand Cayman (KY)

(72) Inventors: Xiaojie Jin, Los Angeles, CA (US); Weibo Gong, Beijing (CN); Quanwei Huang, Beijing (CN); Xiaohui Shen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/711,497

(22) PCT Filed: Nov. 18, 2022

(86) PCT No.: PCT/SG2022/050838
§ 371 (c)(1),
(2) Date: May 17, 2024

(87) PCT Pub. No.: WO2023/091089
PCT Pub. Date: May 25, 2023

(65) Prior Publication Data
US 2025/0056084 A1       Feb. 13, 2025

(30) Foreign Application Priority Data
Nov. 18, 2021     (CN) .......................... 202111371809.1

(51) Int. Cl.
*H04N 21/431*          (2011.01)
*G06V 10/42*           (2022.01)
(Continued)

(52) U.S. Cl.
CPC ......... *H04N 21/4312* (2013.01); *G06V 10/42* (2022.01); *G06V 10/44* (2022.01); *H04N 21/8113* (2013.01); *H04N 21/8456* (2013.01)

(58) Field of Classification Search
None
See application file for complete search history.

(56) References Cited

U.S. PATENT DOCUMENTS 8,942,542 B1 *   1/2015   Sherrets ............. H04N 21/8456
                                                        386/290
2007/0214417 A1 *   9/2007   Toyama ............... G11B 27/031
(Continued)

FOREIGN PATENT DOCUMENTS

CN          107770457 A         3/2018
CN          109615682 A         4/2019
(Continued)

OTHER PUBLICATIONS

International Patent Application No. PCT/SG2022/050838; Int'l Written Opinion and Search Report; dated Jun. 26, 2023; 8 pages.
(Continued)

*Primary Examiner* — Alexander Q Huerta
(74) *Attorney, Agent, or Firm* — BakerHostetler

(57)          ABSTRACT

The embodiments of the present disclosure provide a video generation method, an apparatus, an electronic device, a storage medium, a computer program product and a computer program, the method including: obtaining a plurality of video segments; determining feature information corresponding to the plurality of video segments; according to the feature information and a plurality of pre-stored rendering effects, determining an effect combination to be added; the rendering effects being animation, special effects or a transition; and generating a target video according to the plurality of video segments and the effect combination to be added.

20 Claims, 3 Drawing Sheets

(51) Int. Cl.
*G06V 10/44* (2022.01)
*H04N 21/81* (2011.01)
*H04N 21/845* (2011.01)

(56) References Cited

U.S. PATENT DOCUMENTS

| | | | | |
|---|---|---|---|---|
| 2012/0308209 A1* | 12/2012 | Zaletel | ................... | G11B 27/34 |
| | | | | 386/E5.028 |
| 2015/0082349 A1* | 3/2015 | Ishtiaq | .............. | H04N 21/4316 |
| | | | | 725/40 |
| 2015/0331943 A1* | 11/2015 | Luo | ......................... | G06F 16/48 |
| | | | | 707/722 |
| 2020/0275133 A1* | 8/2020 | Ni | ...................... | H04N 21/2187 |
| 2020/0285859 A1* | 9/2020 | Feng | ...................... | G06V 10/82 |
| 2021/0225406 A1 | 7/2021 | Han et al. | | |
| 2021/0289186 A1 | 9/2021 | Peng | | |
| 2022/0223183 A1* | 7/2022 | Wang | ................... | G11B 27/036 |
| 2023/0252785 A1* | 8/2023 | Xu | .......................... | G10L 25/57 |
| | | | | 382/100 |

FOREIGN PATENT DOCUMENTS

| | | | |
|---|---|---|---|
| CN | 109688463 | A | 4/2019 |
| CN | 109922277 | A | 6/2019 |
| CN | 110913271 | A | 3/2020 |
| CN | 106373084 | B | 9/2020 |
| CN | 111899322 | A | 11/2020 |
| CN | 112188117 | A | 1/2021 |
| CN | 112533058 | A | 3/2021 |
| CN | 113347465 | A | 9/2021 |
| WO | WO 2020/107908 | A1 | 6/2020 |

OTHER PUBLICATIONS

China Patent Application No. 2021113718091; Office Action; dated Mar. 28, 2025; 20 pages.

China Patent Application No. 202111371809.1; Notice for Registration; dated May 28, 2026; 8 pages.

* cited by examiner

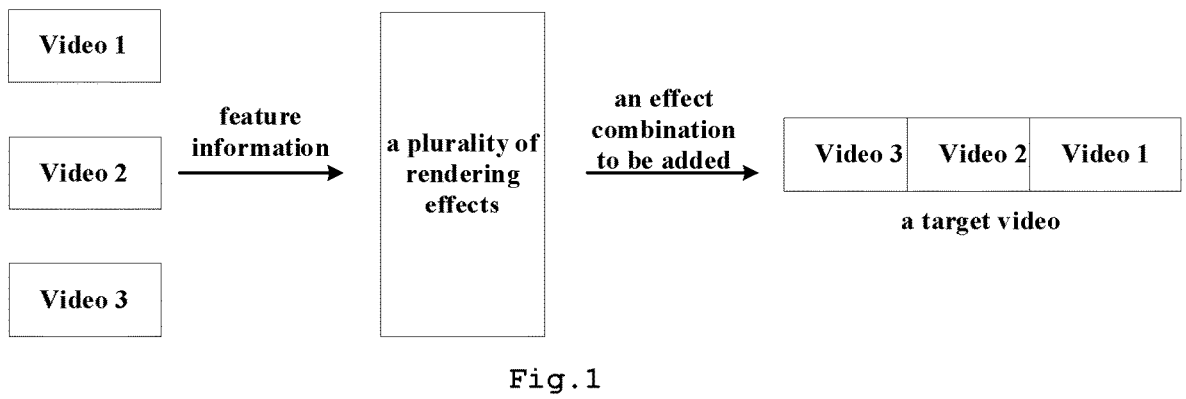

Fig.1

```
┌──────────────────────────────────────────────────────────┐
│        obtaining a plurality of video segments            │──S201
└──────────────────────────────────────────────────────────┘
                            │
                            ▼
┌──────────────────────────────────────────────────────────┐
│  determining feature information corresponding to the      │──S202
│  plurality of video segments                               │
└──────────────────────────────────────────────────────────┘
                            │
                            ▼
┌──────────────────────────────────────────────────────────┐
│  determining the effect combination to be added based on   │──S203
│  the feature information and the plurality of pre-stored    │
│  rendering effects                                          │
└──────────────────────────────────────────────────────────┘
                            │
                            ▼
┌──────────────────────────────────────────────────────────┐
│  generating a target video based on the plurality of video  │──S204
│  segments and the effect combination to be added           │
└──────────────────────────────────────────────────────────┘
```

Fig.2

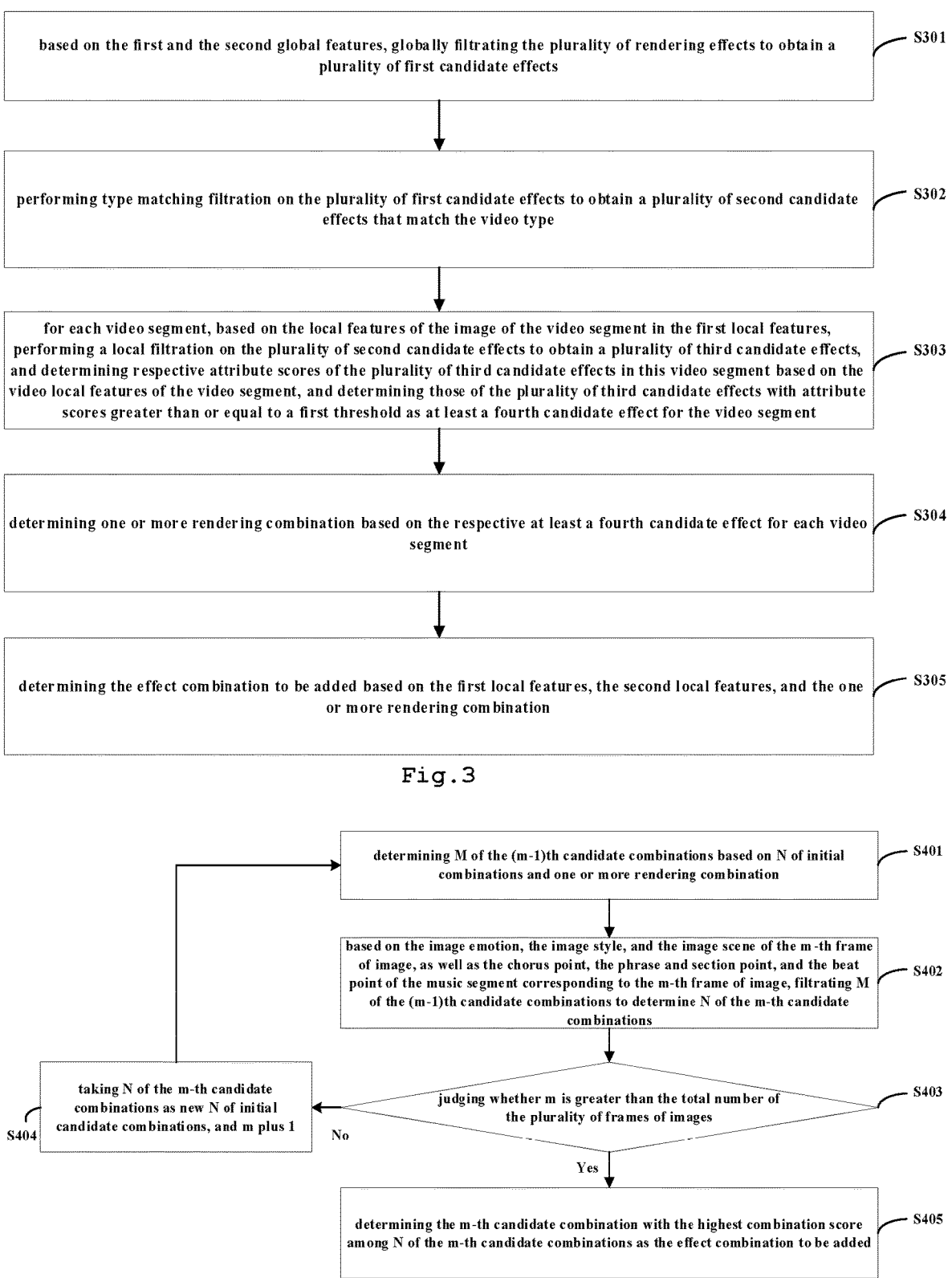

based on the first and the second global features, globally filtrating the plurality of rendering effects to obtain a plurality of first candidate effects — S301 performing type matching filtration on the plurality of first candidate effects to obtain a plurality of second candidate effects that match the video type — S302 for each video segment, based on the local features of the image of the video segment in the first local features, performing a local filtration on the plurality of second candidate effects to obtain a plurality of third candidate effects, and determining respective attribute scores of the plurality of third candidate effects in this video segment based on the video local features of the video segment, and determining those of the plurality of third candidate effects with attribute scores greater than or equal to a first threshold as at least a fourth candidate effect for the video segment — S303 determining one or more rendering combination based on the respective at least a fourth candidate effect for each video segment — S304 determining the effect combination to be added based on the first local features, the second local features, and the one or more rendering combination — S305

Fig.3 determining M of the (m-1)th candidate combinations based on N of initial combinations and one or more rendering combination — S401 based on the image emotion, the image style, and the image scene of the m-th frame of image, as well as the chorus point, the phrase and section point, and the beat point of the music segment corresponding to the m-th frame of image, filtrating M of the (m-1)th candidate combinations to determine N of the m-th candidate combinations — S402 taking N of the m-th candidate combinations as new N of initial candidate combinations, and m plus 1 — S404 judging whether m is greater than the total number of the plurality of frames of images — S403

No

Yes determining the m-th candidate combination with the highest combination score among N of the m-th candidate combinations as the effect combination to be added — S405

VIDEO GENERATION METHOD, APPARATUS, DEVICE, STORAGE MEDIUM AND PROGRAM PRODUCT

CROSS-REFERENCE TO RELATED APPLICATIONS

The present disclosure is a U.S. National Stage Application under 35 U.S.C. § 371 of International Patent Application No. PCT/SG2022/050838, filed on Nov. 18, 2022, which is based on and claims priority of Chinese application for invention No. 202111371809.1, filed on Nov. 18, 2021, the disclosure of both of which are hereby incorporated into this disclosure by reference in its entirety.

TECHNICAL FIELD

This disclosure relates to the field of video generation technology, particularly to a method and a device of video generation, electronic device, storage medium, computer program product and computer program.

BACKGROUND

Currently, an electronic device may combine a plurality of segments of video into one video.

In related art, the electronic device can be installed with video editing application programs, by which users can obtain a plurality of segments of video from one or more original videos by editing and combine them into one video.

In the related art, the current video editing application programs are used to combine a plurality of segments of video into one video, resulting in poor richness of the synthesized video.

SUMMARY

The present disclosure provides a method and a device of video generation, electronic device, storage medium, computer program product and computer program to solve the problem of poor richness of the synthesized video while combining a plurality of segments of video into one video.

The first aspect of the present disclosure is to provide a video generation method, comprising:

obtaining a plurality of video segments;

determining feature information corresponding to the plurality of video segments;

determining an effect combination to be added based on the feature information and a plurality of pre-stored rendering effects; the rendering effects can be animation, special effect, or transition;

generating a target video based on the plurality of video segments and the effect combination to be added.

Optionally, the feature information corresponding to the plurality of video segments comprises one or more of the followings:

video local features corresponding to each video segment, comprising one or more of video impact, video motion speed, video in-direction, or video out-direction;

video type corresponding to the plurality of video segments;

first global features and first local features of a plurality of frames of images extracted from the plurality of video segments, the first global features comprising one or more of image emotion, image style, or image scene, and the first local features comprising the local features corresponding to each frame of image, which comprise one or more of image emotion, image style, or image scene;

second global features and second local features of music matching the plurality of video segments, the second global features comprising one or more of music emotion, music style, or music theme, the second local features comprising one or more of chorus point, phrase and section point, and beat point of a music segment corresponding to each video segment in the music.

Optionally, the determination of the video local features corresponding to each video segment comprises:

by using a video feature extraction model, performing feature extraction on each of the plurality of video segments to obtain the video local features of each video segment.

Optionally, the determination of the video type corresponding to the plurality of video segments comprises:

in response to the selection operation of the target video type from one or more preset video types, determining the target video type as the video type corresponding to the plurality of video segments.

Optionally, the determination of the first global features and first local features of the plurality of frames of images extracted from the plurality of video segments, comprises:

extracting frames from the plurality of video segments to obtain the plurality of frames of images; and by using a pre-stored image feature extraction model, performing feature extraction on the plurality of frames of images to obtain the first global features and the first local features.

Optionally, the determination of the second global features and the second local features of the music that matches the plurality of frames of images comprises:

by using a pre-stored music algorithm, performing feature extraction on the music to obtain the second global features and the second local features.

Optionally, the feature information comprises: video local features, video type, first global features, first local features, second global features, and second local features corresponding to each video segment; and the determining an effect combination to be added based on the feature information and a plurality of pre-stored rendering effects, the rendering effects being animation, special effect, or transition comprises:

based on the first and the second global features, performing a global filtration on the plurality of rendering effects to obtain a plurality of first candidate effects;

performing a type matching filtration on the plurality of first candidate effects to obtain a plurality of second candidate effects that match the video type;

for each video segment, based on the local features of the image corresponding to the video segment in the first local features, performing a local filtration on the plurality of second candidate effects to obtain a plurality of third candidate effects, and determining an attribute score corresponding to each of the plurality of third candidate effects under the each video segment based on the video local features corresponding to the each video segment, and determining those of the plurality of third candidate effects with the attribute scores greater than or equal to a first threshold as at least a fourth candidate effect corresponding to the video segment;

determining one or more rendering combinations based on the one or more fourth candidate effects corresponding to each video segment;

determining the effect combination to be added based on the first local features, the second local features, and the one or more rendering combinations.

Optionally, the video local features comprise video impact, video motion speed, video in-direction, and video out-direction;

the determining an attribute score corresponding to each of the plurality of third candidate effects under the each video segment based on the video local features corresponding to the each video segment comprises:

determining an impact score corresponding to each third candidate effect based on the video impact of the each video segment and impact corresponding to each third candidate effect;

determining a motion score corresponding to each third candidate effect based on the video motion speed of the each video segment and motion speed corresponding to each third candidate effect;

determining an in-direction score corresponding to each third candidate effect based on the video in-direction of the each video segment and in-direction corresponding to each third candidate effect;

determining an out-direction score corresponding to each third candidate effect based on the video out-direction of the each video segment and the out-direction corresponding to each third candidate effect;

for each third candidate effect, determining the product of the impact score, the motion score, the in-direction score, and the out-direction score corresponding to the each third candidate effect as the attribute score corresponding to the each third candidate effect.

Optionally, the determining an impact score corresponding to each third candidate effect based on the video impact of the each video segment and impact corresponding to each third candidate effect comprises:

for the each third candidate effect, obtaining a first impact score of the video impact and a second impact score of the impact corresponding to the each third candidate effect; determining the impact score corresponding to the each third candidate effect based on the first and the second impact scores.

Optionally, the determining a motion score corresponding to each third candidate effect based on the video motion speed of the each video segment and motion speed corresponding to each third candidate effect comprises:

for the each third candidate effect, judging whether the motion speed corresponding to the each third candidate effect is a preset speed;

in response to the motion speed corresponding to the each third candidate effect being the preset speed, determining a first preset score as the motion score corresponding to the each third candidate effect;

in response to the motion speed corresponding to the each third candidate effect not being the preset speed, obtaining a first motion score corresponding to the video motion speed and a second motion score corresponding to the motion speed of the each third candidate effect, and determining the motion score corresponding to the each third candidate effect based on the first and the second motion scores.

Optionally, the determining an in-direction score corresponding to each third candidate effect based on the video in-direction of the each video segment and in-direction corresponding to each third candidate effect comprises:

for the each third candidate effect, judging whether the video in-direction is opposite to the in-direction corresponding to the each third candidate effect;

in response to the video in-direction being opposite to the in-direction corresponding to the each third candidate effect, determining a second preset score as the in-direction score corresponding to the each third candidate effect;

in response to the video in-direction not being opposite to the in-direction corresponding to the each third candidate effect, determining a third preset score as the in-direction score corresponding to the each third candidate effect.

Optionally, the determining an out-direction score of each third candidate effect based on the video out-direction of the each video segment and out-direction of each third candidate effect comprises:

for the each third candidate effect, judging whether the video out-direction is opposite to the out-direction corresponding to the each third candidate effect;

in response to the video out-direction being opposite to the out-direction of the each third candidate effect, determining a fourth preset score as the out-direction score corresponding to the each third candidate effect;

in response to the video out-direction not being opposite to the out-direction corresponding to the each third candidate effect, determining a fifth preset score as the out-direction score corresponding to the each third candidate effect.

Optionally, the generating a target video based on the plurality of video segments and the effect combination to be added comprises:

generating the target video based on the plurality of video segments, the effect combination to be added, and the music.

The second aspect of the present disclosure is to provide a video generation apparatus, comprising:

a video obtaining module, configured to obtain a plurality of video segments;

a feature determination module, configured to determine feature information corresponding to the plurality of video segments;

an effect determination module, configured to determine an effect combination to be added based on the feature information and a plurality of pre-stored rendering effects which may be animation, special effect, or transition;

a video generation module, configured to generate a target video based on the plurality of video segments and the effect combination to be added.

Optionally, the feature information of the plurality of video segments comprises one or more of the followings:

video local features of each video segment, comprising one or more of video impact, video motion speed, video in-direction, or video out-direction;

video type of the plurality of video segments;

first global features and first local features of a plurality of frames of images extracted from the plurality of video segments, the first global features comprising one or more of image emotion, image style, or image scene, and the first local features comprising the local features of each frame of image, which comprise one or more of image emotion, image style, or image scene;

second global features and second local features of music matching the plurality of video segments, the second global features comprising one or more of music emotion, music style, or music theme, the second local features comprising one or more of chorus point, phrase and section point, or beat point of a music segment corresponding to each video segment in the music.

Optionally, the feature determination module is specifically configured to: respectively extract features from the plurality of video segments by using a video feature extraction model to obtain the video local features of each video segment.

Optionally, the feature determination module is specifically configured to: determine the target video type as the video type of the plurality of video segments in response to the selection operation of the target video type from one or more preset video types.

Optionally, the feature determination module is specifically configured to: extract frames from the plurality of video segments to obtain a plurality of frames of images;

extract features from the plurality of frames of images by using a pre-stored image feature extraction model to obtain the first global features and the first local features.

Optionally, the feature determination module is specifically configured to: extract features from the music by using a pre-stored music algorithm to obtain the second global features and the second local features.

Optionally, the feature information comprises: the video local features, the video type, the first global features, the first local features, the second global features, and the second local features corresponding to each video segment;

The effect determination module is specifically configured to:

globally filtrate a plurality of rendering effects to obtain a plurality of first candidate effects based on the first global features and the second global features;

perform a type matching filtration on the plurality of first candidate effects to obtain a plurality of second candidate effects that match the video type;

for each video segment, locally filtrate the plurality of second candidate effects to obtain a plurality of third candidate effects based on the local features of the image of the each video segment in the first local features, and determine the respective attribute scores of the plurality of third candidate effects for this video segment based on the video local features of the video segment, and determine those of the plurality of third candidate effects with attribute scores greater than or equal to a first threshold as at least a fourth candidate effect for the video segment;

determine one or more rendering combinations based on the respective at least a fourth candidate effect for each video segment;

determine the effect combination to be added based on the first local features, the second local features, and the one or more rendering combinations.

Optionally, the video local features comprise video impact, video motion speed, video in-direction, and video out-direction;

the effect determination module is specifically configured to:

determine the impact score of each third candidate effect based on the video impact of the video segment and the impact of each third candidate effect;

determine the motion score of each third candidate effect based on the video motion speed of the video segment and the motion speed of each third candidate effect;

determine the in-direction score of each third candidate effect based on the video in-direction of the video segment and the in-direction of each third candidate effect;

determine the out-direction score of each third candidate effect based on the video out-direction of the video segment and the out-direction of each third candidate effect;

for each third candidate effect, determine the product of the impact score, the motion score, the in-direction score, and the out-direction score of the third candidate effect as the attribute score of the third candidate effect.

Optionally, the effect determination module is specifically configured to: obtain a first impact score of the video impact, and a second impact score for the impact of the third candidate effect, for each third candidate effect; determine the impact score of the third candidate effect based on the first impact score and the second impact score.

Optionally, the effect determination module is specifically configured to: judge whether the motion speed of each third candidate effect is the preset speed, for each third candidate effect;

in response to the motion speed of each third candidate effect being the preset speed, determine a first preset score as the motion score of the each third candidate effect;

in response to the motion speed of each third candidate effect not being the preset speed, obtain a first motion score corresponding to the video motion speed and a second motion score corresponding to the motion speed of the third candidate effect, and determine the motion score of the third candidate effect based on the first and the second motion scores.

Optionally, the effect determination module is specifically configured to: judge whether the video in-direction is opposite to the in-direction of the each third candidate effect, for each third candidate effect;

in response to the video in-direction being opposite to the in-direction of each third candidate effect, for each third candidate effect, determine a second preset score as the in-direction score of the each third candidate effect;

in response to the video in-direction not being opposite to the in-direction of each third candidate effect, for each third candidate effect, determine a third preset score as the in-direction score of the each third candidate effect.

Optionally, the effect determination module is specifically configured to: judge whether the video out-direction is opposite to the out-direction of the each third candidate effect, for each third candidate effect;

in response to the video out-direction being opposite to the out-direction of each third candidate effect, for each third candidate effect, determine a fourth preset score as the out-direction score of the each third candidate effect;

in response to the video out-direction not being opposite to the out-direction of each third candidate effect, for each third candidate effect, determine a fifth preset score as the out-direction score of the each third candidate effect.

Optionally, the effect determination module is specifically configured to: generate a target video based on the plurality of video segments, the effect combination to be added and the music.

The third aspect of the disclosure is to provide an electronic device, comprising a processor and a memory connected in communication with the processor;

the memory storing computer-executable instructions;

the processor executing the computer-executable instructions stored in the memory to implement any one of methods as described in the first aspect.

The fourth aspect of the disclosure is to provide a non-transitory computer-readable storage medium, wherein computer-executable instructions stored in the non-transitory computer-readable storage medium are executed by a processor to implement any one of methods as described in the first aspect.

The fifth aspect of the disclosure is to provide a computer program product, comprising a computer program, wherein the computer program is executed by a processor to implement any one of methods as described in the first aspect.

The sixth aspect of the disclosure is to provide a computer program which, when executed by a processor, realizes the method according to any one of the first aspects.

The present disclosure provides a method and a apparatus of video generation, electronic device, storage medium, computer program product and computer program, wherein the method comprises: obtaining a plurality of video segments; determining feature information of the plurality of video segment; determining an effect combination to be added based on the feature information and a plurality of pre-stored rendering effects which are animation, special effect, or transition; generating a target video based on the plurality of video segments and the effect combination to be added. In the above method, the effect combination to be added is determined based on the feature information and the plurality of pre-stored rendering effects; the rendering effects are animation, special effect, or transition, such that the rendering effect in the effect combination to be added matches the plurality of video segments. Furthermore, based on the plurality of video segments and the effect combination to be added, the target video is generated to have a rendering effect, thereby improving the richness of the target video.

BRIEF DESCRIPTION OF THE DRAWINGS

The accompanying drawings herein are incorporated into the specification and form a part of this specification, illustrating embodiments of the present disclosure and explaining the principles of the present disclosure together with the description.

FIG. 1 is a schematic view of application scenarios provided in the embodiments of the present disclosure.

FIG. 2 is a flow chart of the video generation method provided in the embodiments of the present disclosure.

FIG. 3 is a flow chart of the method for determining the effect combination to be added, provided in the embodiments of the present disclosure.

FIG. 4 is a flow chart of a cyclic method for determining the effect combination to be added, provided in the embodiments of the present embodiment of the disclosure.

Figure 5:
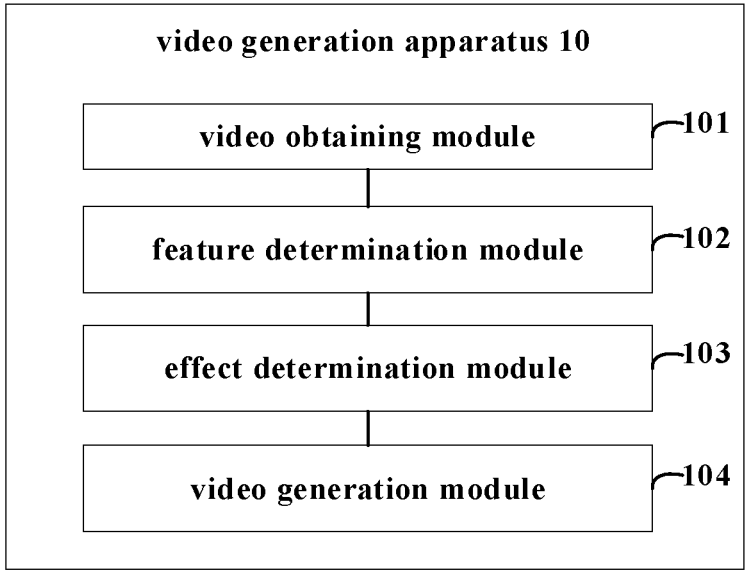
FIG. 5 is a schematic view of the structure of the video generation apparatus provided in the embodiment of the present disclosure.

Through the above drawings, clear embodiments of this disclosure have been shown, and more detailed descriptions will be provided in the following text. These drawings and textual descriptions are not intended to limit the scope of the concept of the present disclosure in any way, but to illustrate the concept of the present disclosure to those skilled in the art by referring to specific embodiments.

DETAILED DESCRIPTION

The exemplary embodiments, which are illustrated in the accompanying drawings, are explained in detail herein. When the following description involves drawings, unless otherwise indicated, the same numbers in different drawings represent the same or similar elements. The embodiments described in the following exemplary embodiments do not represent all embodiments consistent with the present disclosure. On the contrary, they are only examples of devices and methods consistent with some aspects of the present disclosure as detailed in the attached claims.

Firstly, the technique terms involved in the present disclosure are interpreted.

Animation refers to the effect of deformation and displacement on a frame of image.

Transition refers to the effect of switching between two frames of images.

Special effect refers to applying particle effects or shade/color changes to an image.

Next, the related art is presented. In related art, using a video editing application program, users can obtain a plurality of video segments from one or more original videos by editing and combine these plurality of video segments into one video, resulting in poor richness of the synthesized video.

In the present disclosure, in order to improve the richness of the synthesized video, the inventors propose to use a plurality of video segments and rendering effects to generate a target video, such that the synthesized video obtained has the aforesaid rendering effects, thereby improving the richness of the synthesized video.

Next, the application scenarios involved in the present disclosure will be explained in conjunction with FIG. 1. Please refer to FIG. 1 for details.

FIG. 1 is a schematic view of the disclosure scenario provided in the embodiments of the present disclosure. As shown in FIG. 1, a plurality of video segments and a target video are comprised. For example, a plurality of video segments comprise Video 1, Video 2, and Video 3.

In the present disclosure, an effect combination to be added is determined based on feature information of the plurality of video segments and a plurality of pre-stored rendering effects, and a target video is generated based on the plurality of video segments and the effect combination to be added. As the effect combination to be added comprises rendering effects, the target video possesses the rendering effects, thereby improving the richness of the target video.

Next, the technical solution of the present disclosure and how it solves the above-mentioned technical problem are explained in detail by exemplifying embodiments. The following embodiments can be combined with each other, and similar concepts or processes may not be repeated in some embodiments. The embodiments of the present disclosure will be described below in conjunction with the accompanying drawings.

FIG. 2 is a flow chart of the video generation method provided in the embodiments of the present disclosure. As shown in FIG. 2, the method comprises steps S201 to S204.

S201, obtaining a plurality of video segments.

Optionally, the executing subject of the embodiments is an electronic device, or a video generation apparatus installed in the electronic device, wherein the video generation apparatus can be established by a combination of software and/or hardware.

The electronic device can be Personal Digital Assistant (PDA), User Device or User Equipment, tablet, desktop computer, camera, recorder, and other devices.

Optionally, the plurality of video segments can be obtained by a user by means of a camera device, or by editing from one or more original videos by means of video editing software.

S202, determining feature information corresponding to the plurality of video segments.

Optionally, the feature information corresponding to the plurality of video segments comprises one or more of the followings:

video local features corresponding to each video segment;

video type corresponding to the plurality of video segments;

first global features and first local features of a plurality of frames of images extracted from the plurality of video segments;

second global features and second local features of music matching the plurality of video segments.

The video local features comprise one or more of: video impact, video motion speed, video in-direction, or video out-direction.

Optionally, the video type is any of the followings: general type, dance, beauty, E-commerce, or game.

The first global features are comprehensive features of all images in the plurality of frames of images, and the first local features are the features of each frame of image in the plurality of frames of images.

The first global features comprise one or more of: image emotion, image style, or image scene.

The first local features comprise the local features of each frame of image. The local features of each frame of image comprise one or more of: image emotion, image style, or image scene.

For example, the image emotion comprises Tm1, Tm2, Tm3, Tm4, and etc., in the Preset Table 1. For example, the image style comprises Tf1, Tf2, and etc., in the Preset Table 2. For example, the image scene comprises Tt1, Tt2, and etc., in the Preset Table 3.

The second global features comprise one or more of: music emotion, music style, or music theme.

For example, music emotion comprises Me1, Me2, and etc., in the Preset Table 4. For example, music style comprises Mf1, Mf2, and etc., in the Preset Table 5. For example, music theme comprises Mt1, Mt2, Mt3, and etc., in the Preset Table 6.

The second local features comprise one or more of: chorus point, phrase and section point, or beat point of a music segment corresponding to each video segment in the music.

Optionally, determination of the video local features of each video segment comprises: by using a video feature extraction model, preforming feature extraction on the plurality of video segments respectively to obtain the video local features of each video segment.

Optionally, determination of the video type of the plurality of video segments comprises: in response to the selection operation of the target video type from one or more preset video types, determining the target video type as the video type of the plurality of video segments. The video type of the target video is any of the followings: general type, dance, beauty, E-commerce, or game.

Optionally, determination of the first global features and first local features of the plurality of frames of images extracted from the plurality of video segments comprises: extracting frames from the plurality of video segments to obtain the plurality of frames of images; by using a pre-stored image feature extraction model, performing feature extraction on the plurality of frames of images to obtain the first global features and the first local features.

Optionally, frames extraction from the plurality of video segments to obtain the plurality of frames of images, comprises: extracting Z frames of images from each video segment and determining the Z frames of images extracted from each video segment as the plurality of frames of images, wherein Z is an integral greater than or equal to 1.

Optionally, determination of the second global features and the second local features of the music that matches the plurality of frames of images comprises: by using a pre-stored music algorithm, performing feature extraction on the music to obtain the second global features and the second local features.

Optionally, the music is either decided by a user, or obtained by a process performed on the plurality of frames of images and a plurality of candidate music by using a preset music matching model.

S203, determining the effect combination to be added based on the feature information and the plurality of pre-stored rendering effects which are animation, special effect, or transition, wherein, the rendering effect can be a plurality of animations, a plurality of special effects, or a plurality of transitions.

Optionally, the effect combination to be added can determined by the following two methods (Method 10 and Method 20)

Method 10: in response to the feature information of the plurality of video segments comprising the video local features of each video segment and video type of the plurality of video segments, S203 specifically comprises:

determining a plurality of third candidate effects that match the video type from the plurality of rendering effects;

determining the sixth score for each third candidate effect based on the video local features of each video segment;

combining those animations, transitions, and special effects with the highest sixth scores among the plurality of third candidate effects to form the effect combination to be added.

Optionally, among the plurality of rendering effects, those rendering effects that do not match the video type can be obtained by manual annotation.

Optionally, the sixth score for each third candidate effect can be determined by the following methods, comprising:

in response to the video local features of the video segment comprising video impact, video motion speed, video in-direction, and video out-direction, for each video segment: an impact score of each third candidate effect is determined based on the video impact of the each video segment and the impact of each third candidate effect; a motion score of each third candidate effect is determined based on the video motion speed of the each video segment and the motion speed of each third candidate effect; an in-direction score of each third candidate effect is determined based on the video in-direction of the each video segment and the in-direction of each third candidate effect; an out-direction score of each third candidate effect is determined based on the video out-direction of the each video segment and the out-direction of each third candidate effect;

for each third candidate effect, the product of the impact score, the motion score, the in-direction score, and the out-direction score of the third candidate effect under each video segment is determined as the sixth score of the third candidate effect.

For example, in response to the plurality of third candidate effects comprising M1 and M2, and the plurality of video segments comprising P1 and P2, for P1, the impact score of each of M1 and M2 is determined based on the video impact of P1 and the impact of the each of M1 and M2; the motion score of each of M1 and M2 is determined based on the video motion speed of P1 and the motion speed of the each of M1 and M2; the in-direction score of each of M1 and M2 is determined based on the video in-direction of P1 and the in-direction of each of M1 and M2; the out-direction of each of M1 and M2 is determined based on the video out-direction of P1 and the out-direction of each of M1 and M2;

for P2, the impact score of each of M1 and M2 is determined based on the video impact of P2 and the impact of the each of M1 and M2; the motion score of each of M1 and M2 is determined based on the video motion speed of P2 and the motion speed of the each of M1 and M2; the in-direction score of each of M1 and M2 is determined based on the video in-direction of P2 and the in-direction of the each of M1 and M2; the out-direction of each of M1 and M2 is determined based on the video out-direction of P2 and the out-direction of the each of M1 and M2;

the product of the impact score, the motion score, the in-direction score, and the out-directions score of M1 under P1 and the impact score, the motion score, the in-direction score, and the out-directions score of M1 under P2 is determined as the sixth score of M1;

the product of the impact score, the motion score, the in-direction score, and the out-directions score of M2 under P1 and the impact score, the motion score, the in-direction score, and the out-directions score of M2 under P2 is determined as the sixth score of M2.

Optionally, for each third candidate effect, the impact score of the third candidate effect can be determined by the following feasible Method 101.

Method 101: obtaining a first impact score of the video segment and a second impact score corresponding to the impact of the third candidate effect; determining the impact score of the third candidate effect based on the first and the second impact scores.

Optionally, the impact of video segment and the impact of the rendering effect can be strong, medium strong, medium, medium weak, or weak.

Optionally, scores corresponding to strong, medium strong, medium, medium weak, or weak can be for example: 5, 4, 3, 2, 1 (or 1, 2, 3, 4, 5, or other values, which will not be elaborated anymore here).

For example, in response to the video impact being strong, the first impact score is 5, and in response to the impact of the third candidate effect being weak, the second impact score is 1.

Optionally, based on the label of the third candidate effect, the second impact score corresponding to the impact of the third candidate effect (i.e., the initial impact score O4) can be obtained from the Preset Table 8.

Specifically, the impact score of the third candidate effect can be determined by the following feasible Equation 1:

$$S_1 = e^{-|p_i - p_j|/4}; \qquad\qquad \text{Equation 1}$$

where, $S_1$ is the impact score of the third candidate effect, $P_i$ is the first impact score, $P_j$ is the second impact score, and e is a natural constant.

Optionally, for each third candidate effect, the motion score of the third candidate effect can be determined by the following feasible Method 102.

Method 102: judging whether the motion speed of the each third candidate effect is a preset speed;

in response to the motion speed of the each third candidate effect being the preset speed, determining a first preset score as the motion score of the each third candidate effect;

in response to the motion speed of the each third candidate effect not being the preset speed, obtaining a first motion score corresponding to the video motion speed and a second motion score corresponding to the motion speed of the each third candidate effect, and determining the motion score of the each third candidate effect based on the first and the second motion scores.

Optionally, the video motion speed can be fast, medium, or slow. The motion speed of the rendering effect can be fast, medium, slow, or unlimited. Optionally, the preset speeds mentioned above can be unlimited.

Optionally, the scores corresponding to fast, medium, or slow can be for example: 3, 2, 1 (or 1, 2, 3, or other values, which will not be elaborated anymore here). For example, in response to the video motion speed being fast, the first motion score is 3, and in response to the motion speed of the each third candidate effect being slow, the second motion score is 1.

Specifically, the motion score of the each third candidate effect can be determined by the following Equation 2:

$$S_2 \begin{cases} = A, & \text{motion speed is unlimited} \\ = e^{-|d_i - d_j|/2}, & \text{motion speed is fast, medium, or slow} \end{cases} ; \qquad \text{Equation 2}$$

where, $S_2$ is the motion score for the each third candidate effect, A is the first preset score, $d_i$ is the first motion score, and $d_j$ is the second motion score. Optionally, A can be 1 or other values.

Optionally, for each third candidate effect, the in-direction score of the third candidate effect can be determined by the following feasible Method 103.

Method 103: judging whether the video in-direction is opposite to the in-direction of the each third candidate effect;

in response to the video in-direction being opposite to the in-direction of the each third candidate effect, determining a second preset score as the in-direction score of the each third candidate effect;

in response to the video in-direction not being opposite to the in-direction of the each third candidate effect, determining a third preset score as the in-direction score of the each third candidate effect.

Specifically, the in-direction score of the each third candidate effect can be determined by the following Equation 3:

$$S_3 \begin{cases} = B, & \text{opposite to the in-direction} \\ = C, & \text{others} \end{cases} ; \qquad \text{Equation 3}$$

wherein, $S_3$ is the in-direction score of the each third candidate effect, B is the second preset score, and C is the third preset score. For example, B can be 0 or other values. For example, C can be 1 or other values.

Optionally, for each third candidate effect, the out-direction score of the each third candidate effect can be determined by the following feasible Method 104.

Method 104: judging whether the video out-direction is opposite to the out-direction of the each third candidate effect;

in response to the video out-direction being opposite to the out-direction of the each third candidate effect, determining a fourth preset score as the out-direction score of the each third candidate effect;

in response to the video out-direction not being opposite to the out-direction of the each third candidate effect, determining a fifth preset score as the out-direction score of the each third candidate effect.

Specifically, the out-direction score of the each third candidate effect can be determined by the following Equation 4:

$$S_4 \begin{cases} = D, & \text{opposite to the out-direction} \\ = E, & \text{others} \end{cases} \quad \text{Equation 4}$$

wherein, $S_4$ is the out-direction score of the each third candidate effect, D is the fourth preset score, and E is the fifth preset score. For example, D can be 0 or other values. For example, E can be 1 or other values.

Method 20: in response to the feature information of the plurality of video segments comprising video local features of each video segment, S203 specifically comprises:

determining a fifth score for each of the plurality of rendering effects based on the video local features of the each video segment;

combining those animations, transitions, and effects with the highest fifth scores among the plurality of rendering effects into the effect combination to be added;

wherein, the method of determining the fifth score for each of the plurality of rendering effects based on the video local features of the each video segment is the same as the method of determining the sixth score for each third candidate effect based on the video local features of the each video segment, and so will not be repeated here anymore.

S204, generating a target video based on the plurality of video segments and the effect combination to be added.

Optionally, the target video can be generated by the following two methods (comprising Method 11 and Method 21)

Method 11: in response to the feature information of the plurality of video segments not comprising the second global features and the second local features of the music that matches the plurality of video segments, the target video is generated based on the plurality of video segments and the effect combination to be added.

Method 21: in response to the feature information of the plurality of video segments comprising the second global features and the second local features of the music that matches the plurality of video segments, the target video is generated based on the plurality of video segments, the effect combination to be added, and the music.

Optionally, the effect combination to be added may comprise the one or more rendering effects for each video segment of the plurality of video segments, or the one or more rendering effects for the one or more video segments (e.g. 3 videos) among the plurality of video segments (e.g. 5 videos). The one or more rendering effects comprise one or more of: animation, effect, or transition.

It should be noted that the plurality of video segments may comprise video segment without any rendering effect.

For example, in response to the effect combination to be added comprising the one or more rendering effects for each video segment, About Method 11, the target video generation based on the plurality of video segments and the effect combination to be added comprises: playing the plurality of video segments in sequence with the effect combination to be added containing the one or more rendering effects for each video segment to generate the target video;

About Method 21, the target video generation based on the plurality of video segments and the effect combination to be added comprises: playing the plurality of video segments and the music in sequence with the effect combination to be added containing the one or more rendering effects for each video segment to generate the target video;

In the video generation method provided in the embodiment of FIG. 2, the effect combination to be added is determined based on the feature information and the plurality of pre-stored rendering effects; the rendering effect is animation, special effect, or transition, so that the rendering effects in the effect combination to be added match the plurality of video segments. Furthermore, based on the plurality of video segments and the effect combination to be added, the target video is generated to have a rendering effect, thereby improving the richness of the target video.

On the basis of any of the above embodiments, in response to the feature information of the plurality of video segments comprising the video local features of each video segment, the video type, the first global features, the first local features, the second global features, and the second local features of the plurality of video segments, the present disclosure further provides a method for determining the effect combination to be added based on the feature information and the plurality of pre-stored rendering effects. Specifically, please refer to the embodiments in FIG. 3.

FIG. 3 is a flow chart of the method for determining the effect combination to be added provided in the embodiments of the present disclosure. As shown in FIG. 3, the method comprises:

S301, based on the first and the second global features, globally filtrating the plurality of rendering effects to obtain a plurality of first candidate effects.

For example, in response to the first global features comprising image emotion, image style, and image scene, and the second global features comprising music emotion, music style, and music theme, S301 can specifically comprise:

for each rendering effect, based on the label of the each rendering effect, obtaining an initial score O1 corresponding to the image emotion from the Preset Table 1, obtaining an initial score O1 corresponding to the image style from the Preset Table 2, and obtaining an initial score O1 corresponding to the image scene from the Preset Table 3; the sum of the initial scores O1 corresponding to image emotion, image style, and image scene respectively is determined as a score V1 for the rendering effect; determining the effect with the score V1 greater than or equal to a second threshold among the plurality of rendering effects as an intermediate rendering effect;

for each intermediate rendering effect, based on the label of the each intermediate rendering effect, obtaining an initial score O2 corresponding to the music emotion from the Preset Table 4, obtaining an initial score O2 corresponding to the music style from the Preset Table 5, and obtaining an initial score O2 corresponding to the music theme from the Preset Table 6; the sum of the initial scores O2 corresponding to music emotion, music style, and music theme respectively is determined as a score V2 for the intermediate rendering effect; determining the effects with the scores V2 greater than or equal to a third threshold among the plurality of intermediate rendering effects as a plurality of first candidate effects.

TABLE 1

| | Preset | | | |
|---|---|---|---|---|
| Label | Type | Tm1 | Tm2 | . . . |
| J1 | special effect | A11 | A12 | . . . |
| J2 | animation | A21 | A22 | . . . |
| J3 | transition | A31 | A32 | . . . |
| . . . | . . . | . . . | . . . | . . . |

TABLE 2

| | Preset | | | |
|---|---|---|---|---|
| Label | Type | Tf1 | Tf2 | . . . |
| J1 | special effect | B11 | B12 | . . . |
| J2 | animation | B21 | B22 | . . . |
| J3 | transition | B31 | B32 | . . . |
| . . . | . . . | . . . | . . . | . . . |

TABLE 3

| | Preset | | | |
|---|---|---|---|---|
| Label | Type | Tt1 | Tt2 | . . . |
| J1 | special effect | C11 | C12 | . . . |
| J2 | animation | C21 | C22 | . . . |
| J3 | transition | C31 | C32 | . . . |
| . . . | . . . | . . . | . . . | . . . |

TABLE 4

| | Preset | | | |
|---|---|---|---|---|
| Label | Type | Me1 | Me2 | . . . |
| J1 | special effect | D11 | D12 | . . . |
| J2 | animation | D21 | D22 | . . . |
| J3 | transition | D31 | D32 | . . . |
| . . . | . . . | . . . | . . . | . . . |

TABLE 5

| | Preset | | | |
|---|---|---|---|---|
| Label | Type | Mf1 | Mf2 | . . . |
| J1 | special effect | E11 | E12 | . . . |
| J2 | animation | E21 | E22 | . . . |
| J3 | transition | E31 | E32 | . . . |
| . . . | . . . | . . . | . . . | . . . |

TABLE 6

| | Preset | | | |
|---|---|---|---|---|
| Label | Type | Mt1 | Mt2 | . . . |
| J1 | special effect | F11 | F12 | . . . |
| J2 | animation | F21 | F22 | . . . |
| J3 | transition | F31 | F32 | . . . |
| . . . | . . . | . . . | . . . | . . . |

In the Preset Tables 1-6, A11~A32, B11~B32, C11~C32 are all initial scores O1, while D11~D32, E11~E32, F11~F32 are all initial scores O2.

S302, performing type matching filtration on the plurality of first candidate effects to obtain a plurality of second candidate effects that match the video type.

Optionally, the plurality of second candidate effects that match the video type can be obtained by the following two methods (comprising Method 31 and Method 32)

Method 31: the plurality of first candidate effects may have a preset effect type, and can judge whether the video type and the effect type are matched. In response to the video type and the effect type being matched, the first candidate effects with the effect type matching the video type are determined as a plurality of second candidate effects matching the video type.

Method 32: manually annotated effects that do not match the video type are deleted from the plurality of first candidate effects to obtain a plurality of second candidate effects that match the video type.

S303, for each video segment, based on the local features of the image of the video segment in the first local features, performing a local filtration on the plurality of second candidate effects to obtain a plurality of third candidate effects, and determining an attribute score of each of the plurality of third candidate effects in this video segment based on the video local features of the video segment, and determining those of the plurality of third candidate effects with attribute scores greater than or equal to a first threshold as one or more fourth candidate effects for the video segment.

For example, in response to the plurality of video segments comprising P1 and P2, S303 is executed on P1 to obtain one or more fourth candidate effects for P1; S303 is executed on P2 to obtain one or more fourth candidate effects for P2.

Taking P1, P1 corresponding to one frame of image (extracting one frame of image T1 from P1) as an example, a local filtration performed on the plurality of second candidate effects based on the local features of T1 in the first local features to obtain the plurality of third candidate effects are explained.

In response to the local features of T1 comprising image emotion, image style, and image scene, for each second candidate effect, based on the label of the each second candidate effect, an initial score O1 corresponding to image emotion is obtained from the Preset Table 1, an initial score O1 corresponding to image style is obtained from the Preset Table 2, and an initial score O1 corresponding to image scene is obtained from the Preset Table 3; the sum of the initial scores O1 corresponding to the image emotion, the image style, and the image scene respectively is determined as the score V3 of the second candidate effect for T1.

The effects with the score V3 greater than or equal to a fourth threshold among the plurality of second candidate effects are identified as a plurality of third candidate effects.

Optionally, in response to the video local features comprising video impact, video motion speed, video in-direction, and video out-direction, the determination of an attribute scores for each of the plurality of third candidate effects based on the video local features of the video segment, comprises:

an impact score S1 of each third candidate effect is determined based on the video impact of the video segment and the impact of each third candidate effect;

a motion score S2 of each third candidate effect is determined based on the video motion speed of the video segment and the motion speed of each third candidate effect;

an in-direction score S3 of each third candidate effect is determined based on the video in-direction of the video segment and the in-direction of each third candidate effect;

an out-direction score S4 of each third candidate effect is determined based on the video out-direction of the video segment and the out-direction of each third candidate effect;

for each third candidate effect, the product of the impact score S1, the motion score S2, the in-direction score S3, and the out-direction score S4 of the each third candidate effect is determined as the attribute score of the each third candidate effect for a video segment.

Optionally, for each third candidate effect, the impact score of the each third candidate effect can be determined by the above Method 101; the motion score of the each third candidate effect can be determined by the above Method 102; the in-direction score of the each third candidate effect can be determined by the above Method 103; the out-direction score of the each third candidate effect can be determined by the above Method 104.

S304, determining one or more rendering combinations based on the one or more fourth candidate effects for each video segment.

Optionally, the one or more rendering combinations can be determined by the following two methods (comprising Method 41 and Method 42).

Method 41: the one or more rendering combinations are obtained by combining the one or more fourth candidate effects for each video segment.

Method 42: those of the one or more fourth candidate effects for each video segment are combined into an effect set.

In response to the effect set having U fourth candidate effects with the same label, U−1 fourth candidate effects with the same label are removed from the effect set to obtain a candidate set; the fourth candidate effects left in the candidate set are combined to obtain the one or more rendering combinations.

In the above Method 41 and Method 42, each rendering combination comprises one animation, one transition, and one special effect. The one or more rendering combinations may be different. For example, when the one or more rendering combinations comprises combination 1 and combination 2, combination 1 and combination 2 are different.

For example, when the effect set comprises 2 fourth candidate effects labeled J1, 3 fourth candidate effects labeled J2, and 2 fourth candidate effects labeled J3, 1 (i.e., 2-1) fourth candidate effect labeled J1, 2 (i.e., 3-1) fourth candidate effects labeled J2, and 1 (i.e., 2-1) fourth candidate effect labeled J3 are removed from the effect set to obtain the candidate set.

S305, determining the effect combination to be added based on the first local features, the second local features, and the one or more rendering combinations.

In response to the first local features comprising the image emotion, image style, and image scene for each of the plurality of frames of images; and in response to the second global features comprising the chorus point, phrase and section point, and beat point of the music segments corresponding to each of the plurality of frames of images in the music, S305 comprises:

S3051, filtrating the one or more rendering combinations based on the second image emotion, the second image style, and the second image scene of the first frame of image in the plurality of frames of images, as well as the chorus point, the phrase and section point, and the beat point of the music segment corresponding to the first frame of image, to obtain N initial candidate combinations, in which, N is an integer greater than or equal to 1.

The combination score for each rendering combination is determined based on the image emotion, the image style, and the image scene of the first frame of image, and the chorus point, the phrase and section point, and the beat point of the music segment corresponding to the first frame of image; N initial candidate combinations with a combination score greater than or equal to a fifth threshold are determined from the one or more rendering combinations.

For each rendering combination, the determination of the combination score for the each rendering combination based on the image emotion, the image style, and the image scene of the first frame of image, and the chorus point, the phrase and section point, and the beat point of the music segment corresponding to the first frame of image, comprises:

based on the label of each rendering effect in each rendering combination, obtaining initial scores O3 corresponding to the chorus point, the phrase and section point, and the beat point respectively from the Preset Table 7; based on the label of each rendering effect in the each rendering combination, obtaining a score V2 for each rendering effect (the method for calculating the score V2, please refer to the above-mentioned S301); determining a music matching score based on the initial scores O3 corresponding to the chorus point, the phrase and section point, and the beat point respectively, and the score V2 corresponding to each rendering effect;

based on the label of each rendering effect in the rendering combination, obtaining an initial score O1 corresponding to the image emotion from the Preset Table 1, obtaining an initial score O1 corresponding to the image style from the Preset Table 2, and obtaining an initial score O1 corresponding to the image scene from the Preset Table 3; determining the sum of the initial scores O1 corresponding to the image emotion, the image style, and the image scene respectively; obtaining the product of the above sum and S1, S2, S3, S4 obtained in the above-mentioned S303; determining the product of the above product and the preset system as an image matching score;

determining an image inherent score based on the label of each rendering effect in the each rendering combination and the attributes corresponding to the each rendering effect;

determining the music matching score, the image matching score, and the image inherent score mentioned above as a combined score of the each rendering combination.

The above attributes may comprise one or more of the in-direction, the impact, the motion speed, and the out-direction.

For example, in response to the attributes corresponding to each rendering effect comprising the in-direction and the impact, the image inherent score is equal to the sum of an in-direction matching score and a visual impact score, wherein, the in-direction matching score can be determined by the following method: based on the label of each rendering effect in the each rendering combination, obtaining initial scores O4 of each rendering effect for the in-direction from the Preset Table 8; calculating the similarity (such as cosine similarity) between each two rendering effects based on the initial scores O4 of each two rendering effects in the rendering combination for the in-direction; determining the sum of the similarities of the each two rendering effects as the in-direction matching score;

wherein, the visual impact score can be determined by the following method: based on the label of each rendering effect in the each rendering combination, obtaining a second impact score of each rendering effect for the visual impact from the Preset Table 8; determining an impact difference score between each two rendering effects based on the second impact scores of the impacts corresponding to each two rendering effects in the each rendering combination; (optionally, the impact difference score can be obtained by the following equation: $-\beta*|X1-X2|$; in which, $\beta$ is a preset value, $-$ is a negative sign, $*$ is a multiplication sign, X1 is the second impact score of the impact corresponding to one of the two rendering effects, X2 is the second impact score of the impact corresponding to the other rendering effect of the two rendering effects, $|\ |$ is an absolute value); determining the sum of the impact difference scores of each two rendering effects as the visual impact score.

TABLE 7

| | | Preset | | |
| --- | --- | --- | --- | --- |
| Label | Type | Chorus point | Phrase and section point | Beat point |
| J1 | special effect | G11 | G12 | G13 |
| J2 | animation | G21 | G22 | G23 |
| J3 | transition | G31 | G32 | G33 |
| . . . | . . . | . . . | . . . | . . . |

TABLE

| | | Preset | | |
| --- | --- | --- | --- | --- |
| Label | Type | In-direction | Impact | . . . |
| J1 | special effect | H11 | H12 | . . . |
| J2 | animation | H21 | H22 | . . . |
| J3 | transition | H31 | H32 | . . . |
| . . . | . . . | . . . | . . . | . . . |

In the Preset Tables 7-8, G11~G33 are the initial scores O3, and H11~H32 are the initial scores O4.

S3052, determining M of the (m−1)th candidate combinations based on N of initial combinations and one or more rendering combinations, wherein M is equal to the product of N and the total number of the one or more rendering combinations; based on a second image emotion, a second image style, and a second image scene of the m-th frame of image, as well as the chorus point, the phrase and section point, and the beat point of the music segment corresponding to the m-th frame of image, filtrating M of the (m−1)th candidate combinations to determine N of the m-th candidate combinations, and taking N of the m-th candidate combinations as new N of initial candidate combinations, m plus 1, and repeating this step until the last frame of image in the plurality of frames of image is reached, and determining the candidate combination of the last frame of image as the effect combination to be added;

m is an integer greater than or equal to 2, the initial value of m is 2.

It should be noted that S3052 is repeated sequentially for the plurality of frames of images, except for the first frame. We will explain the specific execution method of S3052 below in conjunction with FIG. 4.

FIG. 4 is a flow chart of a cyclic method for determining the effect combination to be added, as provided in some embodiments of the present disclosure. As shown in FIG. 4, the method comprises:

S401, determining M of the (m−1)th candidate combinations based on N of initial combinations and one or more rendering combinations;

M is equal to the product of N and L, where L is the total number of the one or more rendering combinations.

S402, based on the image emotion, the image style, and the image scene of the m-th frame of image, as well as the chorus point, the phrase and section point, and the beat point of the music segment corresponding to the m-th frame of image, filtrating M of the (m−1)th candidate combinations to determine N of the m-th candidate combinations.

The initial value of m is 2

S403, judging whether m is greater than the total number of the plurality of frames of images;

in response to m being greater than the total number of the plurality of frames of images, executing S404; in response to m not being greater than the total number of the plurality of frames of images, executing S405.

S404, taking N of the m-th candidate combinations as new N of initial candidate combinations, and m plus 1, repeating S401~S403.

S405, determining the m-th candidate combination with the highest combination score among N of the m-th candidate combinations as the effect combination to be added.

It should be noted that in response to S405 being executed, it indicates that the m-th frame of image is the last frame of image. At this time, the m-th candidate combination with the highest combination score among N of the m-th candidate combinations is the candidate combination for the last frame of image.

For each of the m-th candidate combination in N of the m-th candidate combinations, the combination score of the m-th candidate combination is equal to the sum of music matching score, image matching score, internal combination score, and combination matching score.

The determining methods for music matching scores and image matching scores can be found in S3051 above mentioned and will not be repeated here anymore.

The internal combination score is equal to the sum of the direction matching score and the visual impact score.

The determining methods for direction matching scores and visual impact scores can be found in S3051 above mentioned and will not be repeated here anymore.

The determination of the combination matching score will be explained, taking the following as examples: a plurality of frames of images comprise the first and the second frames of images, as well as the m-th candidate combination comprises the animation, the transition, and the special effect of the first frame of image, and the animation, the transition, and the special effect of the second frame of image.

Based on the label of each rendering effect in the m-th candidate combination, the initial score O4 of the in-direction corresponding to each rendering effect and the initial score O4 of video impact corresponding to each rendering effect are determined in Preset Table 8;

the first cosine similarity between the initial score O4 of the in-direction corresponding to the animation of the first frame of image and the initial score O4 of the in-direction corresponding to the animation of the second frame of image is calculated;

the second cosine similarity between the initial score O4 of the in-direction corresponding to the transition of the first frame of image and the initial score O4 of the in-direction corresponding to the transition of the second frame of image is calculated;

the third cosine similarity between the initial score O4 of the in-direction corresponding to the special effect of the first frame of image and the initial score O4 of the in-direction corresponding to the special effect of the second frame of image is calculated;

the impact difference score Y1 is determined based on the initial score O4 of the video impact corresponding to the animation of the first frame of image and the initial score O4 of the video impact corresponding to the animation of the second frame of image;

the impact difference score Y2 is determined based on the initial score O4 of the video impact corresponding to the transition of the first frame of image and the initial score O4 of the video impact corresponding to the transition of the second frame of image;

the impact difference score Y3 is determined based on the initial score O4 of the video impact corresponding to the special effect of the first frame of image and the initial score O4 of the video impact corresponding to the special effect of the second frame of image;

the sum of the first cosine similarity, the second cosine similarity, the third cosine similarity, the impact difference score Y1, the impact difference score Y2, the impact difference score Y2, and impact difference score Y3 is determined as the combination matching score.

The method for determining the impact difference score Y1, the impact difference score Y2, and the impact difference score Y3 is similar to the method for determining the impact difference score of each two rendering effects in S3051 above mentioned, and so will not be repeated here anymore.

FIG. 5 is a schematic view of the structure of the video generation apparatus provided in some embodiments of the present disclosure. As shown in FIG. 5, the video generation apparatus 10 comprises:

a video obtaining module 101, configured to obtain a plurality of video segments;

a feature determination module 102, configured to determine the feature information of the plurality of video segments;

an effect determination module 103, configured to determine the effect combination to be added based on the feature information and a plurality of pre-stored rendering effects which may be animation, special effect, or transition;

a video generation module 104, configured to generate a target video based on the plurality of video segments and the effect combination to be added.

The video generation apparatus 10 provided in the embodiment of the present disclosure can perform the methods shown in any of the above embodiments, with similar implementation principles and beneficial effects, and so will not be further elaborated here.

Optionally, the feature information of the plurality of video segments comprises one or more of the followings:

video local features of each video segment, comprising one or more of: video impact, video motion speed, video in-direction, or video out-direction;

video type of the plurality of video segments;

first global features and first local features of plurality of frames of images extracted from the plurality of video segments, the first global features comprising one or more of: image emotion, image style, or image scene, and the first local features comprising the local features of each frame of image, which comprise one or more of: image emotion, image style, or image scene;

second global features and second local features of music matching the plurality of video segments, the second global features comprising one or more of: music emotion, music style, or music theme, the second local features comprising one or more of: chorus point, phrase and section point, or beat point of a music segment corresponding to each video segment in the music.

Optionally, the feature determination module 102 is specifically configured to: respectively extract features from the plurality of video segments by using a video feature extraction model to obtain the video local features of each video segment.

Optionally, the feature determination module 102 is specifically configured to: determine the target video type as the video type of the plurality of video segments in response to the selection operation of the target video type from one or more preset video types.

Optionally, the feature determination module 102 is specifically configured to: extract frames from the plurality of video segments to obtain a plurality of frames of images;

extract features from the plurality of frames of images by using a pre-stored image feature extraction model to obtain the first global features and the first local features.

Optionally, the feature determination module 102 is specifically configured to: extract features from the music by using a pre-stored music algorithm to obtain the second global features and the second local features.

Optionally, the feature information comprises: the video local features, the video type, the first global features, the first local features, the second global features, and the second local features corresponding to each video segment;

The effect determination module 103 is specifically configured to:

globally filtrate a plurality of rendering effects to obtain a plurality of first candidate effects based on the first global features and the second global features;

perform a type matching filtration on the plurality of first candidate effects to obtain a plurality of second candidate effects that match the video type;

for each video segment, locally filtrate the plurality of second candidate effects to obtain plurality of third candidate effects based on the local features of the image of the each video segment in the first local features, and determine the respective attribute scores of the plurality of third candidate effects for this video segment based on the video local features of the each video segment, and determine those of the plurality of third candidate effects with attribute scores greater than or equal to a first threshold as at least a fourth candidate effect for the each video segment;

determine one or more rendering combinations based on the one or more fourth candidate effects corresponding to each video segment;

determine the effect combination to be added based on the first local features, the second local features, and the one or more rendering combinations.

Optionally, the video local features comprise video impact, video motion speed, video in-direction, and video out-direction;

the effect determination module 103 is specifically configured to:

determine the impact score of each third candidate effect based on the video impact of the video segment and the impact of each third candidate effect;

determine the motion score of each third candidate effect based on the video motion speed of the video segment and the motion speed of each third candidate effect;

determine the in-direction score of each third candidate effect based on the video in-direction of the video segment and the in-direction of each third candidate effect;

determine the out-direction score of each third candidate effect based on the video out-direction of the video segment and the out-direction of each third candidate effect;

for each third candidate effect, determine the product of the impact score, the motion score, the in-direction score, and the out-direction score of the each third candidate effect as the attribute score of the third candidate effect.

Optionally, the effect determination module 103 is specifically configured to: obtain a first impact score of the video impact, and a second impact score for the impact of the third candidate effect, for each third candidate effect; determine the impact score of the third candidate effect based on the first impact score and the second impact score.

Optionally, the effect determination module 103 is specifically configured to: judge whether the motion speed of each third candidate effect is the preset speed, for each third candidate effect;

in response to the motion speed of each third candidate effect being the preset speed, determine a first preset score as the motion score of the each third candidate effect;

in response to the motion speed of each third candidate effect not being the preset speed, obtain a first motion score corresponding to the video motion speed and a second motion score corresponding to the motion speed of the each third candidate effect, and determine the motion score of the each third candidate effect based on the first and the second motion scores.

Optionally, the effect determination module 103 is specifically configured to: judge whether the video in-direction is opposite to the in-direction of each third candidate effect, for each third candidate effect;

in response to the video in-direction being opposite to the in-direction of each third candidate effect, for each third candidate effect, determine a second preset score as the in-direction score of the each third candidate effect;

in response to the video in-direction not being opposite to the in-direction of each third candidate effect, for each third candidate effect, determine a third preset score as the in-direction score of the each third candidate effect.

Optionally, the effect determination module 103 is specifically configured to: judge whether the video out-direction is opposite to the out-direction of each third candidate effect, for each third candidate effect;

in response to the video out-direction being opposite to the out-direction of each third candidate effect, for each third candidate effect, determine a fourth preset score as the out-direction score of the each third candidate effect;

in response to the video out-direction not being opposite to the out-direction of each third candidate effect, for each third candidate effect, determine a fifth preset score as the out-direction score of the each third candidate effect.

Optionally, the effect determination module 103 is specifically configured to: generate a target video based on the plurality of video segments, the effect combination to be added and the music.

The video generation apparatus 10 provided in the embodiment of the present disclosure can perform the methods shown in any of the above embodiments, with similar implementation principles and beneficial effects, and so will not be further elaborated here.

Figure 6:
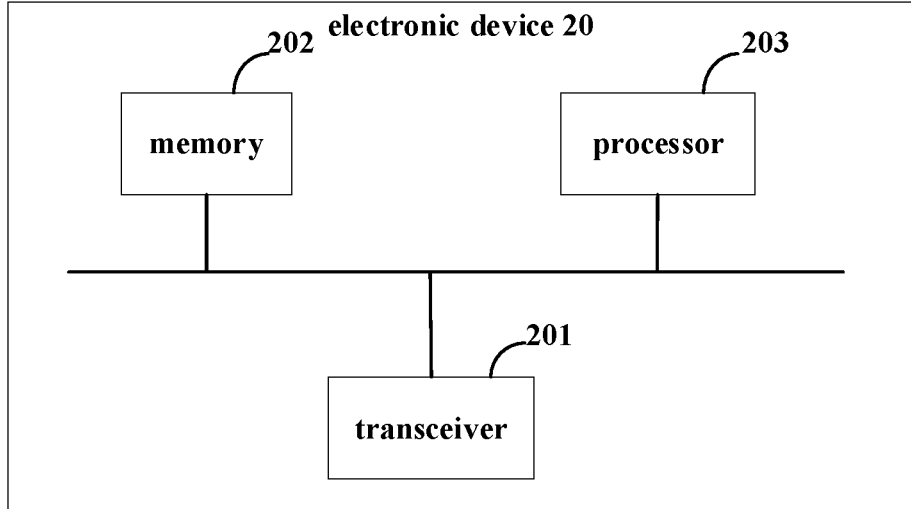
FIG. 6 is a schematic view of hardware of the electronic device.

FIG. 6 is a schematic view of hardware of the electronic device provided in the embodiment of the present disclosure. As shown in FIG. 6, the electronic device 20 may comprise: a transceiver 201, a memory 202, and a processor 203.

The transceiver 201 may comprise: a emitter and/or a receiver.

The emitter can also be referred to as a sender, transmitter, send port, or send interface, among similar descriptions.

The receiver can also be referred to as receiver, receiving machine, receiving port, or receiving interface, among similar descriptions.

For example, the transceiver 201, the memory 202, and the processor 203 are connected to each other through a bus.

The memory 202 is used to store computer-executable instructions.

The processor 203 is used to execute computer-executable instructions stored in the memory 202, to implement the video generation method above mentioned.

The embodiments of the present disclosure provides a non-transitory computer-readable storage medium, in which computer-executable instructions are stored. In response to the computer-executable instructions being executed by a processor, any of the methods in the above embodiments of methods can be implemented.

The embodiments of the present disclosure also provides a computer program product, comprising a computer program, in response to the computer program being executed by a processor, the computer program can implement any of the methods in the above embodiments of methods.

The embodiments of the present disclosure also provides a computer program, in response to the computer program being executed by a processor, the computer program can implement any of the methods in the above embodiments of methods.

The implementation of all or part of the steps in the above embodiments of methods can be completed through hardware related to program instructions. The aforementioned program can be stored in a readable memory. When the program is executed, the execution comprises steps of the above embodiments of methods; while the aforementioned memory (storage medium) comprises: Read-Only Memory (ROM), Random Access Memory (RAM), flash memory, hard disk, solid-state drive, magnetic tape, floppy disk, optical disc, and any combination thereof.

The embodiments of the present disclosure are described with reference to the flow charts and/or block diagrams of the method, the equipment (system), and the computer program product according to the embodiments. It should be understood that each step and/or block in the flow chart and/or block diagram as well as the combination of steps and/or blocks in the flow chart and/or block diagram can be implemented by computer program instructions. These computer program instructions can be provided to a general-purpose computer, a specialized computer, an embedded processor, or a processing unit of other programmable data processing equipment to generate a machine, such that the instructions executed by a computer or a processing unit of other programmable data processing equipment generate a device for implementing the functions specified by (at least) a step of a flow chart and/or (at least) a block of a block diagram.

These computer program instructions can also be stored in a computer-readable memory that can guide computers or other programmable data processing equipment to work in a specific way, so that the instructions stored in the computer-readable memory generate a manufacturing product comprising an instruction device that implements the functions specified by (at least) a step of a flow chart and/or (at least) a block of a block diagram.

These computer program instructions can also be loaded into a computer or other programmable data processing equipment to perform a series of operations in the computer or other programmable devices to generate computer-implemented processing, Thus, instructions executed by computers or other programmable devices provide steps for implementing the functions specified by (at least) a step of a flow chart and/or (at least) a block of a block diagram.

Obviously, those skilled in the art can make various modifications and variations to the embodiments of the present disclosure without departing from the spirit and scope of the present disclosure. In this way, if these modifications and variations of the embodiments of the present disclosure fall within the scope of the claims of the present disclosure and their equivalent technologies, the present disclosure also intends to comprise these modifications and variations.

In the present disclosure, the term "comprising" and its variations may refer to a non-restrictive comprising; The term "or" and its variations may refer to "and/or". The terms "first", "second", and etc., in this disclosure are used to distinguish similar objects but not necessarily mean to describe a specific order or sequence. In the present disclosure, "at least one" refers to one or more, and "and/or" describes the association relationship between the associated objects, that means there can be three types of relationships, such as A and/or B, which can represent: the existence of A alone, the coexistence of A and B, and the existence of B alone. The character "/" generally indicates that the associated object is of an OR relationship.

Those skilled in the art will easily come up with other embodiments of the present disclosure after considering the specification and practicing the present disclosure. This disclosure aims to cover any variations, uses, or adaptive changes of the present disclosure, which follow the general principles of the present disclosure and comprise common knowledge or conventional technical means in the art not disclosed in the present disclosure. The specification and embodiments are only considered to be exemplary, and the real scope and spirit of this disclosure are indicated in the following claims.

It should be understood that the present disclosure is not limited to the precise structure described above and shown in the drawings, and various modifications and changes can be made without departing from its scope. The scope of the present disclosure is limited only by the accompanying claims.

What is claimed is:

1. A video generation method, comprising:

obtaining a plurality of video segments;

determining feature information corresponding to the plurality of video segments;

determining an effect combination to be added based on the feature information and a plurality of rendering effects, the rendering effects being animation, special effect, or transition; and generating a target video based on the plurality of video segments and the effect combination to be added, wherein the determining the effect combination to be added comprises:

performing a global filtration on the plurality of rendering effects to obtain a plurality of first candidate effects based on global features extracted from the plurality of video segments, performing a type matching filtration on the plurality of first candidate effects to obtain a plurality of second candidate effects that match a video type corresponding to the plurality of video segments, performing a local filtration on the plurality of second candidate effects to obtain a plurality of third candidate effects based on local features corresponding to each of the plurality of video segments and determining an attribute score corresponding to each of the plurality of third candidate effects with respect to each of the plurality of video segments, determining at least a subset of the plurality of third candidate effects with the attribute score greater than or equal to a first threshold as at least one fourth candidate effect corresponding to each of the plurality of video segments, determining at least one rendering combination based on the at least one fourth candidate effect corresponding to each of the plurality of video segments, and determining the effect combination to be added based on the local features and the at least one rendering combination.

2. The method according to claim 1, wherein the feature information corresponding to the plurality of video segments comprises one or more of the followings:

video local features corresponding to each video segment, comprising one or more of video impact, video motion speed, video in-direction, or video out-direction;

the video type corresponding to the plurality of video segments;

first global features and first local features of a plurality of frames of images extracted from the plurality of video segments, the first global features comprising one or more of image emotion, image style, or image scene, and the first local features comprising the local features corresponding to each frame of image, which comprise one or more of image emotion, image style, or image scene;

second global features and second local features of music matching the plurality of video segments, the second global features comprising one or more of music emotion, music style, or music theme, the second local features comprising one or more of chorus point, phrase and section point, or beat point of a music segment corresponding to each video segment in the music.

3. The method according to claim 2, wherein the determination of the video local features corresponding to each video segment comprises:

by using a video feature extraction model, performing feature extraction on each of the plurality of video segments to obtain the video local features corresponding to each video segment.

4. The method according to claim 2, wherein the method further comprises determining the video type corresponding to the plurality of video segments, wherein the determining the video type corresponding to the plurality of video segments comprises:

in response to selecting a target video type from one or more preset video types, determining the target video type as the video type corresponding to the plurality of video segments.

5. The method according to claim 2, wherein the determination of the first global features and the first local features of the plurality of frames of images extracted from the plurality of video segments, comprises:

extracting frames from the plurality of video segments to obtain the plurality of frames of images; and by using a pre-stored image feature extraction model, performing feature extraction on the plurality of frames of images to obtain the first global features and the first local features.

6. The method according to claim 2, wherein the determination of the second global features and the second local features of the music that matches the plurality of frames of images, comprises:

by using a pre-stored music algorithm, performing feature extraction on the music to obtain the second global features and the second local features.

7. The method according to claim 2, wherein:

the video local features comprise video impact, video motion speed, video in-direction, and video out-direction; and the determining an attribute score corresponding to each of the plurality of third candidate effects with respect to each of the plurality of video segments comprises:

determining an impact score corresponding to each third candidate effect based on the video impact of the each video segment and impact corresponding to each third candidate effect;

determining a motion score corresponding to each third candidate effect based on the video motion speed of the each video segment and motion speed corresponding to each third candidate effect;

determining an in-direction score corresponding to each third candidate effect based on the video in-direction of the each video segment and in-direction corresponding to each third candidate effect;

determining an out-direction score corresponding to each third candidate effect based on the video out-direction of the each video segment and out-direction corresponding to each third candidate effect; and for each third candidate effect, determining the product of the impact score, the motion score, the in-direction score, and the out-direction score corresponding to the each third candidate effect as the attribute score corresponding to the each third candidate effect.

8. The method according to claim 7, wherein the determining an impact score corresponding to each third candidate effect based on the video impact of the each video segment and impact corresponding to each third candidate effect comprises:

for the each third candidate effect, obtaining a first impact score of the video impact and a second impact score of the impact corresponding to the each third candidate effect; determining the impact score corresponding to the each third candidate effect based on the first and the second impact scores.

9. The method according to claim 2, wherein the generating a target video based on the plurality of video segments and the effect combination to be added comprises:

generating the target video based on the plurality of video segments, the effect combination to be added, and the music.

10. The method according to claim 7, wherein the determining a motion score corresponding to each third candidate effect based on the video motion speed of the each video segment and motion speed corresponding to each third candidate effect comprises:

for the each third candidate effect, judging whether the motion speed corresponding to the each third candidate effect is a preset speed;

in response to the motion speed corresponding to the each third candidate effect being the preset speed, determining a first preset score as the motion score corresponding to the each third candidate effect;

in response to the motion speed corresponding to the each third candidate effect not being the preset speed, obtaining a first motion score corresponding to the video motion speed and a second motion score corresponding to the motion speed corresponding to the each third candidate effect, and determining the motion score corresponding to the each third candidate effect based on the first and the second motion scores.

11. The method according to claim 7, wherein the determining an in-direction score corresponding to each third candidate effect based on the video in-direction of the each video segment and in-direction corresponding to each third candidate effect comprises:

for the each third candidate effect, judging whether the video in-direction is opposite to the in-direction corresponding to the each third candidate effect;

in response to the video in-direction being opposite to the in-direction corresponding to the each third candidate effect, determining a second preset score as the in-direction score corresponding to the each third candidate effect;

in response to the video in-direction not being opposite to the in-direction corresponding to the each third candidate effect, determining a third preset score as the in-direction score corresponding to the each third candidate effect.

12. The method according to claim 7, wherein the determining an out-direction score corresponding to each third candidate effect based on the video out-direction of the each video segment and out-direction corresponding to each third candidate effect comprises:

for the each third candidate effect, judging whether the video out-direction is opposite to the out-direction corresponding to the each third candidate effect;

in response to the video out-direction being opposite to the out-direction corresponding to the each third candidate effect, determining a fourth preset score as the out-direction score corresponding to the each third candidate effect;

in response to the video out-direction not being opposite to the out-direction corresponding to the each third candidate effect, determining a fifth preset score as the out-direction score corresponding to the each third candidate effect.

13. An electronic device, comprising a processor and a memory connected in communication with the processor;

the memory storing computer-executable instructions;

the processor executing the computer-executable instructions stored in the memory to implement operations comprising:

obtaining a plurality of video segments;

determining feature information corresponding to the plurality of video segments;

determining an effect combination to be added based on the feature information and a plurality of pre-stored rendering effects, the rendering effects being animation, special effect, or transition; and generating a target video based on the plurality of video segments and the effect combination to be added, wherein the determining the effect combination to be added comprises:

performing a global filtration on the plurality of rendering effects to obtain a plurality of first candidate effects based on global features extracted from the plurality of video segments, performing a type matching filtration on the plurality of first candidate effects to obtain a plurality of second candidate effects that match a video type corresponding to the plurality of video segments, performing a local filtration on the plurality of second candidate effects to obtain a plurality of third candidate effects based on local features corresponding to each of the plurality of video segments and determining an attribute score corresponding to each of the plurality of third candidate effects with respect to each of the plurality of video segments, determining at least a subset of the plurality of third candidate effects with the attribute score greater than or equal to a first threshold as at least one fourth candidate effect corresponding to each of the plurality of video segments, determining at least one rendering combination based on the at least one fourth candidate effect corresponding to each of the plurality of video segments, and determining the effect combination to be added based on the local features and the at least one rendering combination.

14. The electronic device according to claim 13, wherein the feature information corresponding to the plurality of video segments comprises:

the video type corresponding to the plurality of video segments;

video local features corresponding to each of the plurality of video segments, the video local features comprising one or more of video impact, video motion speed, video in-direction, or video out-direction;

first global features and first local features of a plurality of frames of images extracted from the plurality of video segments, the first global features comprising one or more of image emotion, image style, or image scene, and the first local features comprising the local features corresponding to each frame of image, which comprise one or more of image emotion, image style, or image scene;

second global features and second local features of music matching the plurality of video segments, the second global features comprising one or more of music emotion, music style, or music theme, the second local features comprising one or more of chorus point, phrase and section point, or beat point of a music segment corresponding to each video segment in the music.

15. The electronic device according to claim 14, wherein the operations further comprise determining the video type corresponding to the plurality of video segments, wherein the determining the video type corresponding to the plurality of video segments comprises:

in response to selecting a target video type from one or more preset video types, determining the target video type as the video type corresponding to the plurality of video segments.

16. The electronic device according to claim 14, the operations further comprising:

generating the target video based on the plurality of video segments, the effect combination to be added, and the music.

17. A non-transitory computer-readable storage medium, wherein the non-transitory computer-readable storage medium stores the computer-executable instructions, which, when executed by a processor, cause the processor to implement operations comprising:

obtaining a plurality of video segments;

determining feature information corresponding to the plurality of video segments;

determining an effect combination to be added based on the feature information and a plurality of pre-stored rendering effects, the rendering effects being animation, special effect, or transition; and generating a target video based on the plurality of video segments and the effect combination to be added, wherein the determining the effect combination to be added comprises:

performing a global filtration on the plurality of rendering effects to obtain a plurality of first candidate effects based on global features extracted from the plurality of video segments, performing a type matching filtration on the plurality of first candidate effects to obtain a plurality of second candidate effects that match a video type corresponding to the plurality of video segments, performing a local filtration on the plurality of second candidate effects to obtain a plurality of third candidate effects based on local features corresponding to each of the plurality of video segments and determining an attribute score corresponding to each of the plurality of third candidate effects with respect to each of the plurality of video segments, determining at least a subset of the plurality of third candidate effects with the attribute score greater than or equal to a first threshold as at least one fourth candidate effect corresponding to each of the plurality of video segments, determining at least one rendering combination based on the at least one fourth candidate effect corresponding to each of the plurality of video segments, and determining the effect combination to be added based on the local features and the at least one rendering combination.

18. The non-transitory computer-readable storage medium according to claim 17, wherein the feature information corresponding to the plurality of video segments comprises one or more of the followings:

video local features corresponding to each video segment, comprising one or more of video impact, video motion speed, video in-direction, or video out-direction;

the video type corresponding to the plurality of video segments;

first global features and first local features of a plurality of frames of images extracted from the plurality of video segments, the first global features comprising one or more of image emotion, image style, or image scene, and the first local features comprising the local features corresponding to each frame of image, which comprise one or more of image emotion, image style, or image scene;

second global features and second local features of music matching the plurality of video segments, the second global features comprising one or more of music emotion, music style, or music theme, the second local features comprising one or more of chorus point, phrase and section point, or beat point of a music segment corresponding to each video segment in the music.

19. The non-transitory computer-readable storage medium according to claim 18, wherein the determination of the video local features corresponding to each video segment comprises:

by using a video feature extraction model, performing feature extraction on each of the plurality of video segments to obtain the video local features corresponding to each video segment.

20. The non-transitory computer-readable storage medium according to claim 18, wherein the operations further comprise determining the video type corresponding to the plurality of video segments, wherein the determining the video type corresponding to the plurality of video segments comprises:

in response to selecting a target video type from one or more preset video types, determining the target video type as the video type corresponding to the plurality of video segments.

* * * * *